United States Patent Office 3,729,480
Patented Apr. 24, 1973

3,729,480
N¹-(SUBSTITUTED ACETYL) INDAZOLES AND
THEIR USE IN PESTICIDAL COMPOSITIONS
Pasquale P. Minieri, Woodside, N.Y., assignor to
Tenneco Chemicals, Inc.
No Drawing. Continuation-in-part of applications Ser. No.
589,235, Oct. 25, 1966, now Patent No. 3,637,736,
dated Jan. 25, 1972, and Ser. No. 689,812, Dec. 12,
1967, now Patent No. 3,641,050, dated Feb. 8, 1972.
This application May 24, 1971, Ser. No. 146,486
Int. Cl. C07d 49/18
U.S. Cl. 260—310 C       5 Claims

ABSTRACT OF THE DISCLOSURE

Compounds that have the structural formula

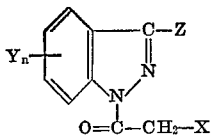

wherein X represents halogen, phenoxy, or thiocyanato; Y represents halogen or nitro; Z represents halogen or hydrogen; and $n$ is an integer in the range of zero to 2 can be used to control the growth of various plant and animal pests. Among the most active of these compounds is N¹-chloroacetyl-6-nitroindazole.

---

This is a continuation-in-part of my copending application Ser. No. 589,235, which was filed on Oct. 25, 1966 and which is now U.S. Patent No. 3,637,736, and my copending application Ser. No. 689,812, which was filed on Dec. 12, 1967 and which is now U.S. Patent No. 3,641,050.

This invention relates to certain N¹-(substituted acetyl)-indazoles and to the use of these compounds in the control of various plant and animal pests.

In accordance with this invention, it has been discovered that certain N¹-(substituted acetyl)-indazoles have unusual and valuable activity as fungicides, insecticides, and herbicides. These compounds may be represented by the structural formula

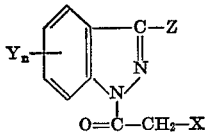

wherein X represents chlorine, bromine, fluorine, iodine, phenoxy, or thiocyanato; Y represents chlorine, bromine, fluorine, iodine, or nitro; Z represents hydrogen, chlorine, bromine, fluorine, or iodine; and $n$ represents an integer in the range of zero to 2.

Illustrative of the compounds of this invention are the following:

N¹-chloroacetyl-4-chloroindazole,
N¹-chloroacetyl-4-nitroindazole,
N¹-bromoacetyl-3-chloroindazole,
N¹-fluoroacetyl-7-fluoroindazole,
N¹-iodoacetyl-3,6-dibromoindazole,
N¹-phenoxyacetyl-5-chloroindazole,
N¹-phenoxyacetyl-3,7-dibromoindazole,
N¹-thiocyanatoacetyl-4,6-dichloroindazole,
N¹-thiocyanatoacetyl-3,5,6-trichloroindazole,
N¹-thiocyanatoacetyl-3-chloro-5,6-dinitroindazole,
N¹-thiocyanatoacetyl-3,5-difluoroindazole, and the like.

The most active of these compounds as pesticides are those in which X is chlorine or thiocyanato, Y is chlorine or nitro in the 5 and/or 6 position, and Z is hydrogen or chlorine. Illustrative of these preferred compounds are N¹-chloroacetyl-5-chloroindazole,
N¹-chloroacetyl-5-nitroindazole,
N¹-chloroacetyl-6-nitroindazole,
N¹-thiocyanatoacetyl-6-nitroindazole and
N¹-thiocyanatoacetyl-3-chloro-6-nitroindazole.

The N¹-haloacetyl-indazoles of this invention may be prepared by heating the appropriate substituted indazole with a haloacetyl chloride. This reaction is generally carried out in the presence of an amine, for example, triethylamine, and a solvent, for example, benzene, toluene, xylene, acetone, pyridine, ethanol, or ethylene dichloride, at the reflux temperature of the reaction mixture. When the N¹-haloacetyl-indazoles are heated with an alkali metal thiocyanate, preferably potassium thiocyanate, in one of the aforementioned solvents, the N¹-thiocyanatoacetyl-indazoles are obtained in a good yield.

The biocidal compounds of this invention may be applied to a wide variety of plant and insect pests to control or inhibit their growth. While each of the N¹-substituted acetyl-indazoles has been found to be useful in the control of the growth of at least one of the aforementioned types of organisms, the particular pest upon which each exerts its major effort is largely dependent upon the nature of the substituents on the rings. For example, N-chloroacetyl-6-nitroindazole is most effective as a selective herbicide, while N¹-thiocyanatoacetyl-3-chloro-6-nitroindazole is most effective as a foliar fungicide.

While the N¹-(substituted acetyl)-indazoles may be used as such in the process of this invention, they are usually and preferably used in combination with an inert carrier that facilitates the dispensing of dosage quantities of the pesticide and assists in its absorption by the organism whose growth is to be controlled. The pesticidal compounds may be mixed with or deposited upon inert particulate solids, such as fuller's earth, talc, diatomaceous earth, hydrated calcium silicate, kaolin, and the like, to form dry particulate compositions. Such compositions may, if desired, be dispersed in water with or without the aid of a surface-active agent. The pesticidal compounds are preferably dispensed in the form of solutions or dispersions in inert organic solvents, water, or mixtures of inert organic solvents and water, or as oil-in-water emulsions. The concentration of the pesticide in the compositions may vary within wide limits and depends upon a number of factors, the most important of which are the type or types of organisms being treated and the rate at which the composition is to be applied. In most cases the composition contains approximately 0.1 percent to 85 percent by weight of one or more of the aforementioned N¹-(substituted acetyl)-indazoles. If desired, the compositions may contain other fungicides, such as sulfur and the metal dimethyldithiocarbamates; insecticides, such as chlordane and benzene hexachloride; or plant nutrients, such as urea, ammonium nitrate, and potash.

The amount of the composition used is that which will bring about satisfactory control of the growth of the organism. To achieve control of fungi and insects the amount of the composition that is used is that which will apply to the locust or to the organism about 50 p.p.m. to 10,000 p.p.m. of the indazole since these amounts will ordinarily control the pest without injuring plants. Herbicidal compositions are usually used in amounts that will apply about 1 pound to 20 pounds of the active compound per acre.

The invention is further illustrated by the examples that follow.

EXAMPLE 1

To a mixture of 32.6 grams (0.2 mole) of 6-nitroindazole, 20.2 grams (0.2 mole) of triethylamine, and 400 ml. of benzene which had been heated to its reflux temperature was added over a period of one hour 22.6 grams (0.2 mole) of chloroacetyl chloride. The mixture was heated at its reflux temperature for 1.5 hours and then filtered while hot. The filtrate was heated at atmospheric pressure to remove the benzene, and the resulting solid product was recrystallized from chloroform and dried. There was obtained 34 grams of $N^1$-chloroacetyl-6-nitroindazole, which melted at 143°–146° C. and which contained 17.6 percent N and 14.8 percent Cl (calculated for $C_9H_6ClN_3O_3$, 17.5 percent N and 14.8 percent Cl). The structure of the compound was confirmed by infrared analysis.

EXAMPLE 2

A mixture of 43.3 grams (0.18 mole) of $N^1$-chloroacetyl-6-nitroindazole, 17.6 grams (0.18 mole) of potassium thiocyanate, and 300 ml. of acetone was heated at its reflux temperature (59° C.) for two hours, cooled to room temperature, allowed to stand for 48 hours, and then filtered. There was obtained 37.2 grams of $N^1$-thiocyanatoacetyl-6-nitroindazole, which melted at 137°–139° C. and which contained 21.4 percent N and 12.2 percent S (calculated for $C_{10}H_6N_4O_3S$, 20.8 percent N and 12.3 percent S).

EXAMPLE 3

Using the procedure described in Example 1, 3-chloro-6-nitroindazole was reacted with chloroacetyl chloride. The $N^1$-chloroacetyl-3-chloro-6-nitroindazole obtained melted at 122°–125° C. and contained 25.0 percent Cl and 14.8 percent N (calculated, 25.9 percent Cl and 15.3 percent N).

EXAMPLE 4

Using the procedure described in Example 2, $N^1$-chloroacetyl-3-chloro-6-nitroindazole was heated with potassium thiocyanate and acetone to form $N^1$-thiocyanatoacetyl-3-chloro-6-nitroindazole. The product melted at 108°–115° C. and contained 18.5 percent N, 11.9 percent Cl, and 11.4 percent S (calculated, 19.0 percent N, 12.0 percent Cl, and 10.9 percent S).

EXAMPLE 5

Using the procedure described in Example 1, 6-nitroindazole was reacted with fluoroacetyl chloride to form $N^1$-fluoroacetyl-6-nitroindazole.

EXAMPLE 6

Using the procedure described in Example 1, 5-chloroindazole was reacted with chloroacetyl chloride. The $N^1$-chloroacetyl-5-chloroindazole obtained melted at 137.5°–140° C. and contained 30.4 percent Cl and 12.2 percent N (calculated, 31.0 percent Cl and 12.2 percent N).

EXAMPLE 7

Using the procedure described in Example 2, $N^1$-chloroacetyl-5-chloroindazole was heated with potassium thiocyanate and acetone to form $N^1$-thiocyanatoacetyl-5-chloroindazole.

EXAMPLE 8

Using the procedure described in Example 1, 3-chloroindazole was reacted with chloroacetyl chloride to form $N^1$-chloroacetyl-3-chloroindazole.

EXAMPLE 9

Using the procedure described in Example 1, 6-nitroindazole was reacted with phenoxyacetyl chloride to form $N^1$-phenoxyacetyl-6-nitroindazole, which was found to contain 14.1 percent N (calculated, 14.2 percent N) and to melt at 203°–205° C.

EXAMPLE 10

Using the procedure described in Example 1, 3-chloro-5-nitroindazole was reacted with chloroacetyl chloride. The $N^1$-chloroacetyl-3-chloro-5-nitroindazole obtained melted at 105°–110° C. and contained 20.2 percent N (calculated 21.3 percent N).

EXAMPLE 11

Acetone solutions were prepared by dissolving 100 mg. portions of the products of Examples 1–10 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the indazoles. More dilute solutions were prepared by adding distilled water to the solutions.

EXAMPLE 12

A series of tests was carried out in which $N^1$-(substituted acetyl) indazoles were evaluated as herbicides. In these tests a group of flats containing seedlings of various plant species was sprayed with an aqueous solution prepared according to the procedure of Example 11. The results of the tests were observed 14 days after the application of the test compounds and are reported in Table I. In this table a rating of 0 indicates no effect; 1 to 3 indicates slight injury; 4 to 6 indicates moderate injury; 7 to 9 indicates severe injury; and 10 indicates that all plants were killed.

TABLE I

| | Product of— | | |
|---|---|---|---|
| | Ex. 1 | Ex. 3 | Ex. 10 |
| Biocide: Dosage (lbs./acre) | 10 | 10 | 10 |
| Plant species: | | | |
| Clover | 5 | 9 | 3 |
| Sugar beets | 9 | 9 | 10 |
| Soybeans | 9 | 6 | 4 |
| Corn | 4 | 2 | 0 |
| Wheat | 3 | 6 | 7 |
| Oats | 4 | 2 | 3 |
| Mustard | 9 | 6 | 9 |
| Morning glory | 7 | 10 | 3 |
| Buckwheat | 6 | 10 | 0 |
| Crabgrass | 5 | 9 | 3 |
| Foxtail | 7 | 6 | 0 |

EXAMPLE 13

Tomato plants that were 6–8 inches tall were sprayed until the liquid dripped from the leaves with aqueous solutions prepared by the procedure described in Example 11. When the plants had dried, they were sprayed with a suspension of the spores of the tomato early blight fungus *Alternaria solani*. One week after treatment, the degree of suppression of the disease was noted. The results are given in Table II.

TABLE II

| Biocide | Concentration of biocide in solution (p.p.m.) | Percent control of early blight of tomato |
|---|---|---|
| Product of Example 4 | 500 | 100 |
| | 100 | 94 |
| | 20 | 64 |
| Product of Example 6 | 1,000 | 47 |
| Product of Example 9 | 1,000 | 37 |

Each of the other $N^1$-(substituted acetyl) indazoles herein disclosed can also be used to control the growth of plant and insect pests.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A compound having the structural formula

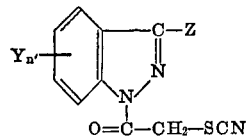

wherein Y represents halogen or nitro; Z represents hydrogen or halogen; and $n'$ represents an integer in the range of 1 to 2.

2. The compound as set forth in claim 1 that is $N^1$-thiocyanatoacetyl-6-nitroindazole.

3. A compound having the structural formula

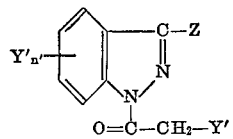

wherein Y' represents halogen, Z represents halogen or hydrogen, and $n'$ represents an integer in the range of 1 to 2.

4. The compound as set forth in claim 3 that is $N^1$-chloroacetyl-5-chloroindazole.

5. $N^1$-chloroacetyl-3-chloro-6-nitroindazole.

References Cited

FOREIGN PATENTS 1,568,790   4/1969   France _____ 260—310 C

OTHER REFERENCES

Auwers et al.: Liebigs Ann. Chem., vol. 451, pp. 298–9 relied on (1927).

Auwers et al.: Liebigs Ann. Chem., vol. 450, p. 290 relied on (1926).

Auwers et al.: Liebigs Ann. Chem., vol. 438, pp. 14–23 relied on (1924).

Wiley et al.: Pyrazoles, Pyrazolines, Pyrazolidines, Indazoles and Condensed Rings, pp. 315–7, New York, Interscience-Wiley, 1967.

NATALIE TROUSOF, Primary Examiner

U.S. Cl. X.R.

71—92; 424—273